United States Patent [19]

Lee

[11] Patent Number: 5,346,241
[45] Date of Patent: Sep. 13, 1994

[54] VEHICLE SUSPENSION SYSTEM FOR A STEERABLE WHEEL

[75] Inventor: Unkoo Lee, Kyungki, Rep. of Korea

[73] Assignee: Hyundai Motor Company, Seoul, Rep. of Korea

[21] Appl. No.: 172,802

[22] Filed: Dec. 27, 1993

[30] Foreign Application Priority Data

Dec. 28, 1992 [KR] Rep. of Korea ............ 92-25848

[51] Int. Cl.$^5$ ............................................. B60G 3/00
[52] U.S. Cl. ................................. 280/691; 280/673; 280/690; 280/696
[58] Field of Search ............ 280/673, 675, 670, 660, 280/666, 687, 688, 690, 691, 696, 701

[56] References Cited

U.S. PATENT DOCUMENTS

| | | | |
|---|---|---|---|
| 4,522,418 | 6/1985 | Struck et al. | 280/673 X |
| 4,671,531 | 6/1987 | Sutton et al. | 280/690 X |
| 4,923,209 | 5/1990 | Armbrust et al. | 280/696 X |
| 4,986,567 | 1/1991 | Karbo et al. | 280/690 |

FOREIGN PATENT DOCUMENTS

| | | | |
|---|---|---|---|
| 0106713 | 4/1989 | Japan | 280/673 |
| 0038114 | 2/1990 | Japan | 280/691 |

*Primary Examiner*—Margaret A. Focarino
*Assistant Examiner*—Christopher P. Ellis
*Attorney, Agent, or Firm*—Birch, Stewart, Kolasch & Birch

[57] ABSTRACT

A vehicle suspension system for a steerable wheel which can enhance the free layout degree by making it possible to provide an imaginary kingpin axis, and ensures an optimal geometrical efficacy by changing the camber angle ideally, including a steering knuckle for rotatably supporting a wheel, a connecting arm including an upper side projection, a wheel side projection and a lower side projection, and having an upper connecting point of the wheel side projection connected to an upper end of the steering knuckle by a ball joint, a pair of upper control arms disposed to cross each other, and a member for connecting an upper part of the connecting arm to a vehicle body, a lower control arm for connecting a lower end of the steering knuckle to the vehicle body, a control link pivotally connected between a lower connecting point of the lower side projection of the connecting arm and a projection of the lower control arm that is projected upward at a middle point of the lower control arm, and a strut arm including a shock absorber and a spring, and having the upper part connected to the vehicle body by an insulated connection part.

4 Claims, 4 Drawing Sheets

VEHICLE SUSPENSION SYSTEM FOR A STEERABLE WHEEL

BACKGROUND OF THE INVENTION

1. Field of the Invention

The present invention relates to a vehicle suspension system for a steerable wheel and, in particular, to a vehicle suspension system for a steerable wheel which can enhance a free layout degree by making it easy to provide an imaginary kingpin axis, and enable cambers thereof to change optimally.

2. Description of Related Art

In general, a vehicle suspension system for a steerable wheel connects an axle and a vehicle body to each other, and absorbs vibrations and impacts from a road surface while running, thereby obtaining safety in a vehicle and an improved ride comfort.

To absorb impacts, a vehicle suspension system should be flexibly connected in a vertical direction, and to endure driving force, braking force and centrifugal force generated at a wheel during a vehicle's turning, a vehicle suspension should be connected firmly in a horizontal direction.

The vehicle suspension system is classified structurally as an axle integral suspension system integrated with a shaft and an independent suspension system. While an axle integral suspension system is applied to large-sized vehicles such as buses, trucks and rear axles of passenger cars, an independent suspension system is applied mainly to an axle of a passenger car. To improve ride comfort and running safety, an independent suspension is bisected to act independently.

Among these suspension systems, the present invention relates to an independent suspension system.

There are many kinds of suspension systems in independent suspension systems. As a suspension system applied to a steerable wheel, Macpherson type and Wishbone type suspensions are widely applied.

A vehicle suspension system for a steerable wheel is designed to control a position of a wheel with respect to the vehicle body to obtain a better positioning in a vehicle operation as well as absorb vibrations or impacts. The axle is thereby prevented from directly transmitting impact or vibration from a road surface to the vehicle body, so that optimal handling safety and running safety can be obtained.

The front wheel is mounted to be changeable in its direction from right to left or from left to right, centering the kingpin, and is also mounted with a geometrical angle to meet front suspension requirements.

Mounting the front wheel with the geometrical angle is called wheel alignment. The wheel alignment is determined by several elements, but the optimal operation of the front wheel is achieved by the supplemental operation of the elements with respect to each other.

A kingpin inclination among the elements reduces a handling force of a steering wheel with a camber, absorbs any impact generated from the vehicle motion and then increases restitution force of the steering wheel. The turning safety of the straight ahead position of the vehicle and the handling safety in a vehicle's turning position are thereby obtained.

The kingpin inclination is such that the kingpin is mounted with its central line lying at a predetermined angle with respect to the vertical line when the vehicle is viewed from the front.

An interval between the central line of the kingpin and a central line of the wheel is called offset. The offset is generally characterized as an offset at the wheel center and an offset at the ground.

The offset at the wheel center has an effect on the straight ahead characteristics of the vehicle when driving force and an engine brake are applied to the wheel.

The offset at the ground has an effect on the handling safety when the vehicle brakes and turns. If the offset at the ground is decreased, the sensitivity with respect to the steering is decreased, while the handling safety is increased when the vehicle brakes and turns.

There is no variation in a camber during ordinary vibration, however, the camber must be changed into a negative (−) valve during a bump, to ensure the running safety of the straight ahead position and the cornering safety.

Considering the above, the conventional suspension system is described in detail hereinafter.

FIG. 4A illustrates a general Macpherson type suspension system including a strut arm 73 formed integrally with a steering knuckle 71, uniting a shock absorber 72 and a spring, a lower arm 74, and a ball joint 75.

This suspension system has some advantages of simple structure, a small spring, light mass, and a small effective volume of an engine room. But in order to have the kingpin offset (a) little or minus, the upper supporting point 76 of the strut arm 73 should be displaced toward the engine room, or the wheel side end of the lower control arm 74 connected to the ball joint 75 should be displaced outside.

However, if the upper supporting point 76 of the strut arm 73 is displaced toward the engine room, the effective volume of the engine room is reduced and the kingpin angle ($\alpha$) becomes excessively large only to have a bad effect on cornering safety of a vehicle.

If the wheel side end of the lower control arm 74 connected to the ball joint 75 is displaced outside, it is actually impossible to reduce the kingpin offset ($\alpha$) because it will interfere with a brake disk attached to a wheel 77.

FIG. 4B illustrates a general Wishbone type suspension system which comprises upper and lower control arms 81, 82, a steering knuckle 83, a spring assembly 85 including a shock absorber 84, and ball joints 86, 87 connecting the upper and lower control arms 81, 82 to the steering knuckle 83.

To adjust the kingpin offset ($\alpha$), a vehicle body side connecting point 88 of the upper control arm 81 should be displaced toward the engine room, or the ball joint 87 of the lower control am 82 should be displaced outside.

In a Wishbone type suspension system, however, as well as a Macpherson type suspension system, if the vehicle body side connecting point 88 of the upper control arm 81 is displaced toward the engine room, the effective volume of an engine room is reduced and the kingpin angle ($\alpha$) becomes excessively large to adversely affect cornering safety of a vehicle, and if the ball joint 87 of the lower control am 82 is displaced outside, it is actually impossible to reduce the kingpin offset (a) because it will interfere with a brake disk attached to a wheel 89.

SUMMARY OF THE INVENTION

As noted above, the conventional Macpherson type suspension and Wishbone type suspension have a limitation to improve the function of suspension systems, because a free layout degree to provide a kingpin angle is limited to such a tiny bound that it is impossible to reduce the size of a kingpin offset. Besides, the vertical motion of a wheel is actuated by short control arms in any type, and so, the great change in the height of a roll center makes running safety worse.

In view of such problems of the conventional technology, the present invention is provided. A primary object of the invention is to enhance the free layout degree by making it possible to provide an imaginary kingpin axis. Another object of the invention is to ensure an optimal geometrical efficacy by optimal change of a camber.

To accomplish the above objects, the present invention provides a vehicle suspension system for a steerable wheel comprising a steering knuckle for rotatably supporting a wheel; a connecting arm including an upper side projection, a wheel side projection and a lower side projection, and having an upper connecting point of the wheel side projection connected to an upper end of the steering knuckle by a ball joint; an X-shaped upper control for connecting an upper part of the connecting arm to a vehicle body; a lower control arm for connecting a lower end of the steering knuckle to the vehicle body; a control link pivotally connected between a lower connecting point of the lower side projection of the connecting arm and an upward projection at a middle point of the lower control arm; and a strut arm including a shock absorber and a spring, and having an upper part connected to the vehicle body by an insulated connecting part.

The upper control arm includes a front arm and a rear arm, and the front arm and the rear arm cross each other in an X-shape. In order to dispose the front and rear arms in an X-shape without interfering with each other, a middle part of an arm disposed downward is formed into a downward bend, and a middle part of an arm disposed upward is formed into an upward bend.

It is to be understood that both the foregoing general description and the following detailed description are exemplary and explanatory, and are intended to provide further explanation of the invention as claimed.

The accompanying drawings are included to provide a further understanding of the invention and are incorporated in and constitute a part of this specification, illustrate one embodiment of the invention and together with the description, serve to explain the principles of the invention.

DETAILED DESCRIPTION OF THE PREFERRED EMBODIMENTS

Figure 1:
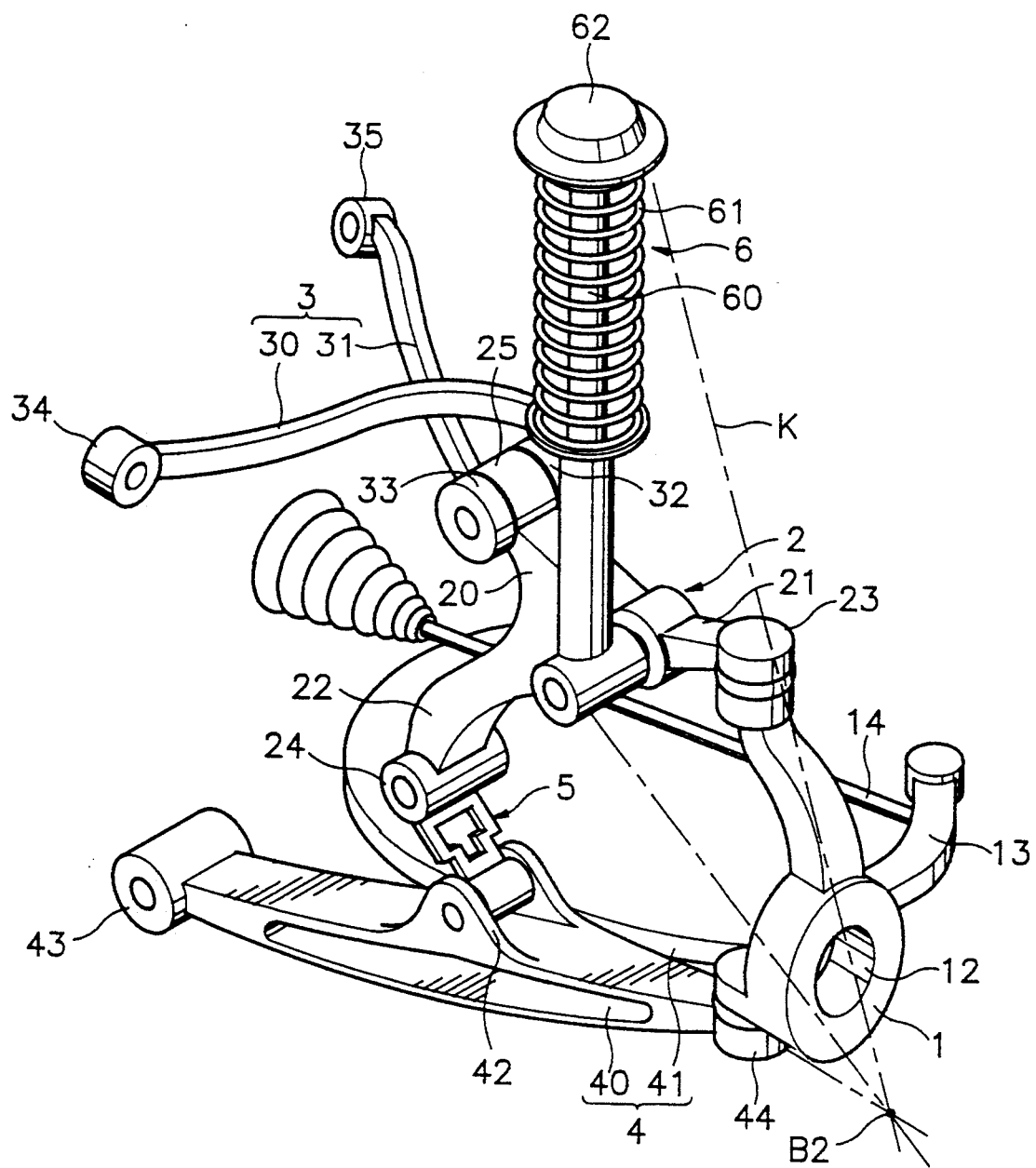
FIG. 1 is a perspective view of a suspension system of the present invention.
Figure 2:
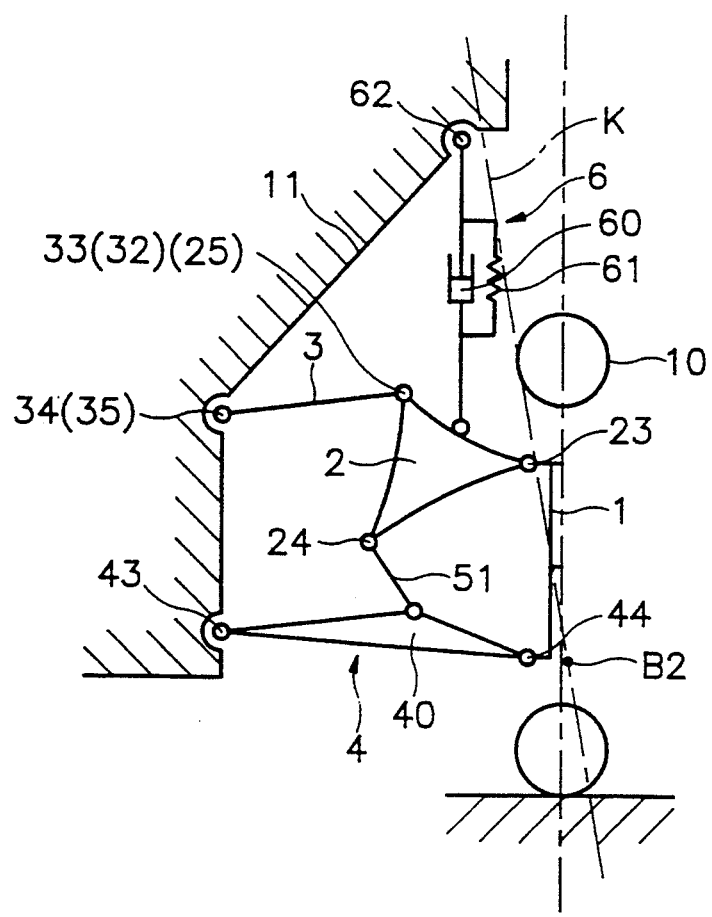
FIG. 2 is a schematic diagram illustrating the second dimensional state of a suspension system of the present invention.

FIGS. 1 and 2 are respectively a perspective view and a schematic diagram for illustrating the second dimensional state of a suspension system of the present invention.

The present invention provides a suspension system comprising a steering knuckle 1 for rotatably supporting a wheel 10; a connecting arm 2 connected to an upper end of the steering knuckle 1; an upper control arm 3 connecting an upper part of the connecting arm 2 to a vehicle body 11; a lower control arm 4 connecting a lower end of the steering knuckle 1 to the vehicle body 11 and enabling the steering knuckle 1 including the wheel 10 to move up and down with respect to the vehicle body 11; a control link 5 connecting the connecting arm 2 to the lower control arm 4; and a strut arm 6 as a shock-absorbing member.

In the case of a steerable drive wheel, the steering knuckle 1 has a penetrated hole 12 to insert a drive shaft provided with a spindle (not shown) to drive the wheel 10.

At the rear part of the steering knuckle 1 is formed a projection B where a known tie rod 14 is connected by a ball joint to steer the steering knuckle 1.

The connecting arm 2 includes an upper side projection 20, a wheel side projection 21 and a lower side projection 22, and an upper connecting point 23 of the wheel side projection 21 is connected to an upper end of the steering knuckle 1 by a ball joint.

A lower end connecting point 24 of the lower side projection 22 of the connecting arm 2 is connected to an upper end of the control link 5 by a rubber bush. The control link 5 has a lower end connected to a projection 42 positioned at a middle part of a front arm 40 of the lower control arm 4 by a rubber bush.

The upper end of the control link 5 connecting the connecting arm 2 to the lower control arm 4 is slanted toward the vehicle body with respect to the lower end to operate harmoniously therewith. An upper end connecting point 25 of the upper side projection 20 of the connecting arm 2 is connected to a pair of wheel side connecting points 32, 33 of the upper control arm 3 including a pair of a front arm 30 and a rear arm 31 by a rubber bush.

A pair of vehicle body side connecting points 34, 35 of the upper control arm 3 are connected to the vehicle body 11 by a rubber bush, and to enhance the solidity of the upper control arm 3, the pair of arms 30, 31 are disposed to cross to each other at a middle part thereof in an X-shape.

In order to dispose the front and rear arms 30, 31 in an X-shape without interfering with each other, a middle part of an arm disposed downward is bent downward, and a middle part of an arm disposed upward is bent upward.

As an example, FIG. 1 of the drawings of the embodiment illustrate the front arm 30 disposed upward and the rear arm 31 disposed downward.

The lower control arm 4 connecting a lower end of the steering knuckle 1 to the vehicle body 11 includes a pair of a front arm 40 and a rear arm 41, and both side ends of the front and rear arms have connecting points respectively 43, 44 (marks of the connecting points of the rear arm 41 are not affixed because the connecting points are not shown). The vehicle body side connecting points 43 are pivotally connected to the vehicle body 11 by a rubber bush, and the wheel side connecting points 44 are concentrated on a lower surface of the steering knuckle and connected to it by a ball joint.

Rubber bushes and ball joints used in connecting the arms 2, 3, 4, and link 5 to the vehicle body 11 and steering knuckle 1 are made of the same materials as those used in the conventional suspension, and enable the wheel 10 including the steering knuckle 1 to move up and down with respect to the vehicle body 11.

Rubber bushes have elasticity to control the control arms 2, 3, 4, and link 5 properly.

The strut arm 6, as a shock-absorbing member, includes a shock absorber 60 and a spring 61, is supported to the vehicle body 11 by the insulated connection part 62, and has the lower end pivotally connected to a middle part of the wheel side projection 21 of the connecting arm 2 to absorb the up-and-down impact of the vehicle body 11.

In the suspension system of the present invention as well as the conventional suspension system, when impacts are transmitted from the wheel 10, the wheel 10 rotates centering hinges of the vehicle side connecting points 34, 35, 43 of the upper and lower arms 3, 4, and so, impacts are reduced by the strut arm 6.

A kingpin axis (K) is formed into an imaginary line connecting an intersecting point (B2) of both extended lines connecting the vehicle side connecting points 43 to the wheel side connecting point 44 of the lower control arm 4 respectively, to the wheel side connecting point of the connecting arm 2, as shown in FIGS. 1 and 2.

Accordingly, the kingpin axis (K) is set up and adjusted easily in accordance with an arrangement of the front and rear arms 30, 31, 40, 41 of the upper and lower control arms 3, 4, and enhance a free layout degree.

Moreover, if a kingpin angle is set up ideally, camber change is also set up ideally. Besides setting up the kingpin angle, the camber change is set up by adjusting the length of the upper and lower arms 3, 4, or a link operation of the control link 5.

Figure 3:
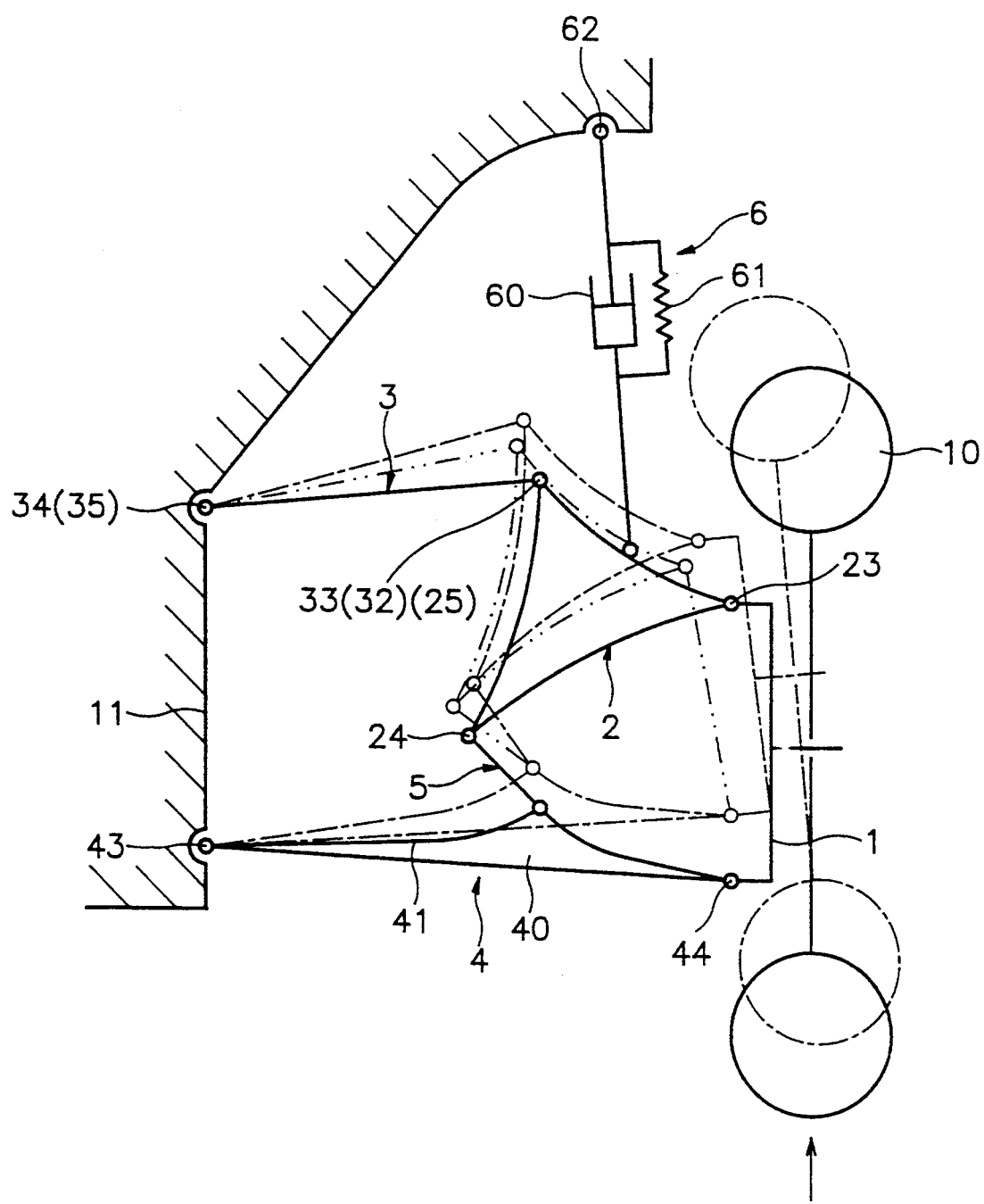
FIG. 3 is a schematic diagram illustrating an operating state.
Figure 4A:
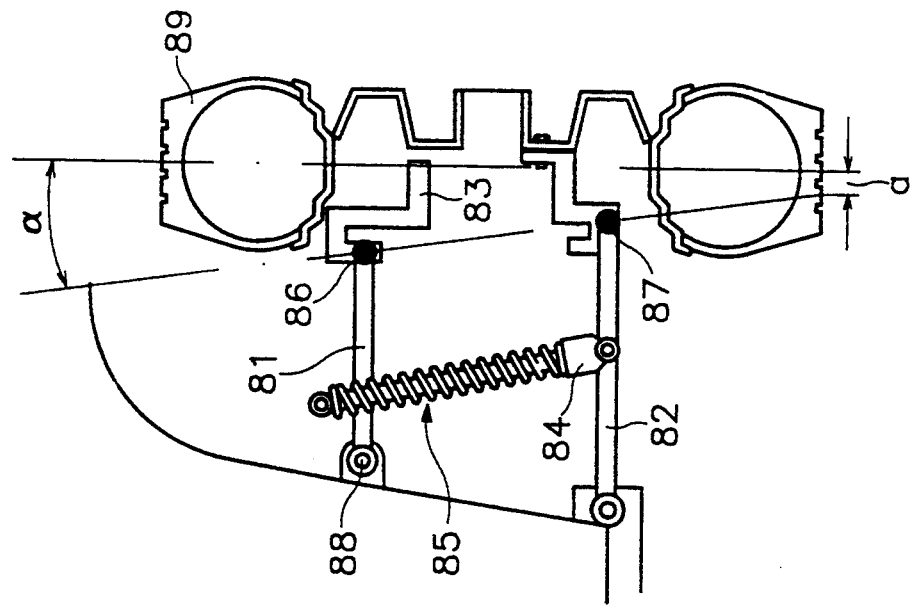
FIGS. 4A and 4B show structures of the conventional art.
Figure 4B:
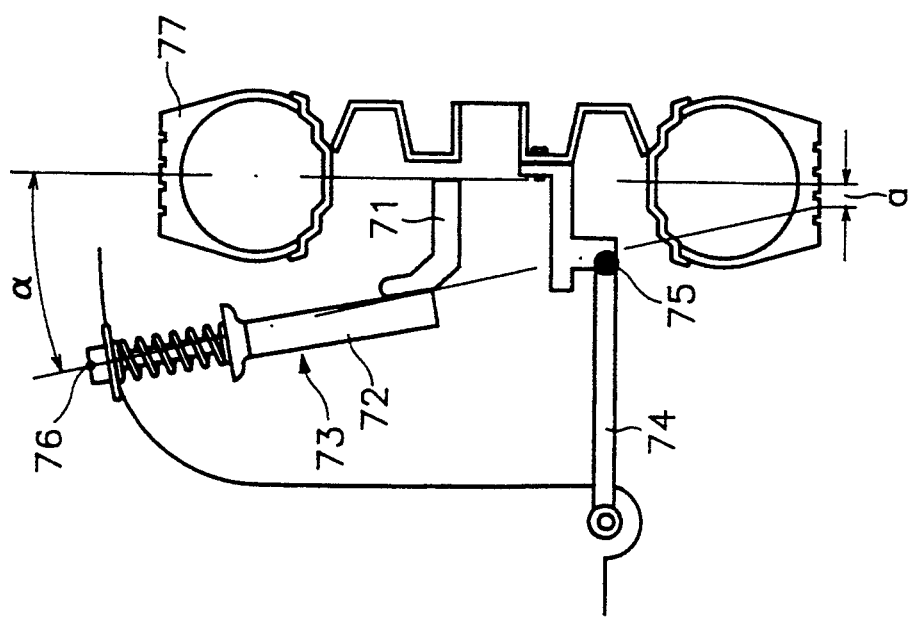

When a force is applied in the direction indicated by an arrow shown in FIG. 3, the wheel 10 as well as the steering knuckle 1 raises the wheel side ends of the lower control arm 4 and the connecting arm 2.

At this time, the lower control arm 4 rotates upwardly along a tracing movement in accordance with the length of the lower control arm 4, and centers the hinge of the vehicle body side connecting point 43 of the front and the rear arms 40, 41 of the lower control arm 4.

But since the connecting arm 2 is positioned between the upper control arm 3 and the control link 5, it moves the upper control arm 3 and the control link 5 geometrically, and a bending operation occurs at the connecting points 24, 25 coordinated with a link operation in accordance with an extent of a bump of the steering knuckle 1.

In such a bump operation of the wheel 10, a lifting will occur in the conventional technique, but in the present invention, as the strut arm 6 supported by the middle part of the connecting arm 2 practices tensile force, the connecting arm 2 is forced to rotate downward clockwise centering the upper end connecting point 25.

Accordingly, the wheel side connecting point of the connecting arm 2 is forced to rise and fall at the same time, finally the connecting arm 2 itself is lifted but the wheel side connecting point 23 is pulled down a little.

The extent for the wheel side connecting point 23 of the connecting arm 2 to be pulled down is defined by the trajectory of the control link 5 connected to the lower side connecting point 24 of the connecting arm 2.

The falling of the wheel side connecting point 23 means that the connecting point 23 pulls the upper part of the steering knuckle 1 toward the vehicle body 11.

And, the camber angle changes into being negative (−) as illustrated by the chain line with two dots in FIG. 3.

The change in the camber angle is absorbed to be lost by the mutual bending operation of every arm and rubber bush controlling the bending operation with proper elasticity, so the running safety of the straight ahead position is enhanced.

During a vehicle's turning, the change in the camber of the out-rotating wheel becomes negative (−), so cornering safety is improved and all handling safety is improved.

As described above, the present invention can enhance the free layout degree by making it possible to provide an imaginary kingpin axis in accordance with the arrangement of the front and rear arms of the upper and lower control arms, and can ensure an optimal geometrical efficacy by changing the camber angle ideally in accordance with the variation of the length of the upper and lower control arms and the link operations of the connecting arm.

What is claimed is:

1. A vehicle suspension system for a steerable wheel comprising:

a steering knuckle for rotatably supporting a wheel, the steering knuckle including a projection at a rear part connected with a known tie rod by a ball joint to be steered by the tie rod;

a connecting arm including an upper side projection, a wheel side projection, and a lower side projection, the connecting arm having an upper connecting point of the wheel side projection connected to an upper end of the steering knuckle by a ball joint;

an upper control arm including a front arm and a rear arm, the upper control arm having wheel side connecting points connected to an upper end connecting point of the upper side projection of the connecting arm, and vehicle side connecting points connected to a vehicle body;

a lower control arm including a front arm and a rear arm having connecting points at both ends, the lower control arm having the vehicle body side connecting points connected to the vehicle body by a rubber bush, and the wheel sideconnecting points concentrated on a lower part of the steering knuckle and connected to the lower part of the steering knuckle;

a control link pivotally connected between the lower connecting point of the lower side projection of the connecting arm and an upward projection at a middle point of the lower control arm; and a strut arm for absorbing and reducing impact applied in an up-and-down direction with respect to the vehicle body, the strut arm including a shock absorber and a spring, and having an upper part connected to the vehicle body by an insulated connection part, and a lower part pivotally connected to the wheel side projection of the connecting arm.

2. The suspension system according to claim 1, wherein the front and rear arms are disposed to cross each other at a middle part in an X-shape.

3. The suspension system according to claim 2, wherein a middle part of a downward arm is bent downward, and a middle part of an upward arm is bent upward to dispose the front and rear arms in an X-shape without interfering with each other.

4. The suspension system according to claim 1, wherein an upper end of the control link connecting the connecting arm to the lower control arm is slanted toward the vehicle body with respect to the lower end.

* * * * *